July 20, 1954 — A. G. PLATT — 2,683,945
SELF-OPENING AND CLOSING GATE APPARATUS
Filed Jan. 28, 1953 — 2 Sheets-Sheet 1
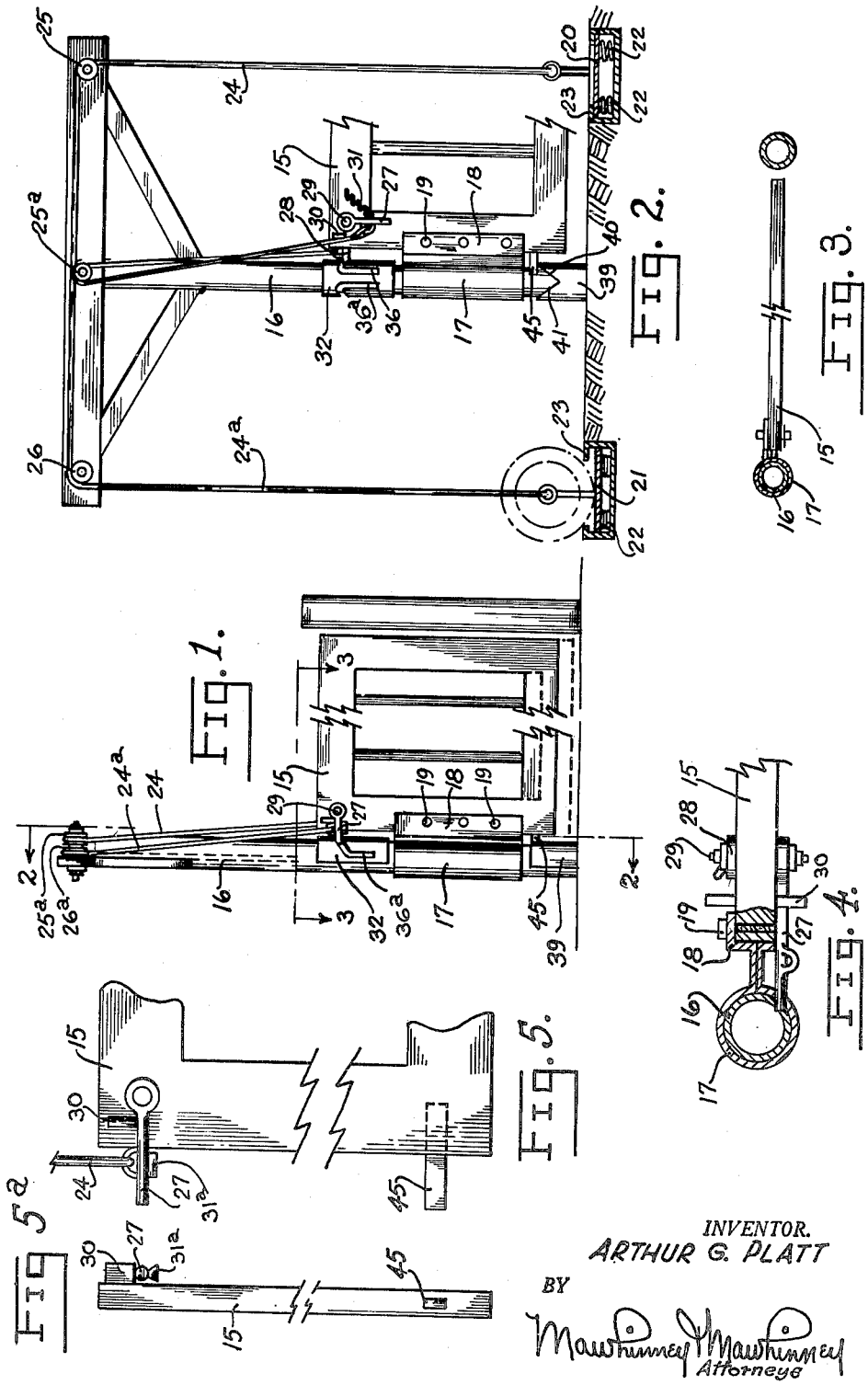
INVENTOR.
ARTHUR G. PLATT
BY
Mawhinney & Mawhinney
Attorneys

Patented July 20, 1954

2,683,945

UNITED STATES PATENT OFFICE 2,683,945

SELF-OPENING AND CLOSING GATE APPARATUS

Arthur G. Platt, Cedar Rapids, Iowa

Application January 28, 1953, Serial No. 333,644

2 Claims. (Cl. 39—11)

The present invention relates to improvements in self-opening and closing gate apparatus and has for an object to provide vehicle actuated apparatus for the automatic opening of a gate incident to the presence of a vehicle at either opposite approach to the gate.

Another object of the invention resides in providing a simple form of coordinate mechanical movement which takes advantage of the potential energy derived from the gate itself by reason of an initial raising of the gate which later is permitted to descend by gravity and through the actuation of cams or equivalent devices to automatically open and subsequently automatically close the gate after the vehicle has passed through the gate opening.

The invention also contemplates the use of selective cam followers, normally retracted, which are projected into operative engagement with cam surfaces active to both open and subsequently close the gate by movement derived from the gravitational motion of the gate in seeking to return to a normal low position after being initially raised.

The invention also contemplates right and left cam tracks for selective engagement by a pair of right and left follower members with connections for selectively engaging the follower members with their respective cam tracks dependent upon the approach of a vehicle from the one or other side of the gate to the end that the gate will swing away from the vehicle as it enters the gate opening.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a side elevational view, with parts broken, illustrating a self opening and closing gate apparatus constructed in accordance with the present invention.

Figure 2 is a vertical sectional view, with parts broken, taken on the line 2—2 in Figure 1 with the gate partly open.

Figure 3 is a horizontal sectional view, with parts broken, taken on the line 3—3 of Figure 1.

Figure 4 is an enlarged partial top edge view of a portion of the gate showing in section the hanger construction with one cam follower projected.

Figure 5 is an enlarged fragmentary side elevational view, with parts broken, of the hinge end of the gate with one of the cam followers raised against its stop.

Figure 5a is an edge elevational view of the gate taken from the left end of Figure 5.

Figures 6, 7:
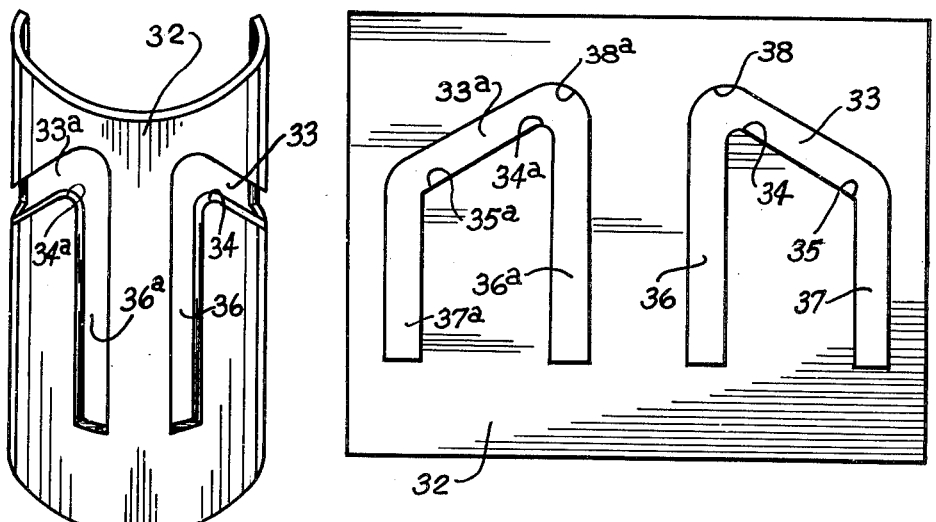
Figure 6 is an enlarged isometric view of the opening cam plate.
Figure 7 is an enlarged plan view of the opening cam plate in a form of original manufacture.

Referring more particularly to the drawings, 15 designates the gate of any suitable construction and 16 the gate post which is preferably of round cross-section in order to accommodate a barrel hinge 17 which rotates about the round post 16 and also slides up and down vertically upon the post to a limited degree. The barrel hinge 17 has hinge leaves 18 projecting therefrom which are secured to the gate by hinge leaf bolts 19. It will be understood that any other form of gate hanger may be employed provided that the same admits of the horizontal swinging movement of the gate from the gate opening in either horizontal direction about the post 16 as a center, and at the same time allows lifting and lowering of the gate 15.

The apparatus is operable either by hand or automatically by the presence of the vehicle at one or the other approaches to the gate 15. Where the device is automatic, the approaches to the gate 15 will be provided with right and left depressible plates or platforms 20 and 21. For convenience in description, the plate 20 may be termed the right depressible plate and the other plate 21, the left depressible plate or platform.

These plates 20 and 21 may be of an area to receive the entire four wheels of a vehicle or they may be made of smaller area to accommodate simultaneously two wheels or even one wheel, the weight imposed by a single wheel of an automobile or other vehicle being sufficient to depress the plates 20, 21 for the purpose of operating the device. In the case of both plates, springs 22 beneath the plates may serve to maintain the plates in an upper position against stop flanges 23. It will be understood that the plates and flanges will be set substantially flush with the surface of the road approaches to the gate 15.

When the plates descend under the weight of a vehicle, they are arranged to pull down upon cables or chains or other flexible connections 24 and 24a. The cable 24 is rove about sheaves 25 and 25a supported from the post 16 or from other adjacent structure. The connection 24ª from the other plate 21 is rove over sheaves 26 and 26ª. The sheaves 25ª and 26ª may be upon a common axis so that the inner end portions of the cables may be brought down side by side adjacent the post 16 and connected respectively to right and left cam followers 27 and 28. Such cam followers may be advantageously in the form of pins or fingers which are pivoted to the gate 15 near the hinge edge thereof but preferably at a high point upon the gate. These cam followers 27 and 28 are at opposite sides of the gate and movably connected thereto by one or more pivots 29, the pivot axis being substantially horizontal so that the cam followers 27, 28 are permitted a swinging movement in two separate vertical planes with the free edges of the cam followers 27 and 28 adapted in the upper position to extend beyond the hinge edge of the gate in order to engage their respective cams as hereinafter described.

In the upper position which is a horizontal position, the cam followers 27, 28 encounter stops 30 on the gate. Springs 31 connected between the cam followers 27, 28 and the gate 15 serve to retract the cam followers 27, 28 down to a vertical position shown in Figure 2.

When projected, the free end portions of the cam followers 27, 28, which project beyond the hinge edge of the gate 15, are arranged to cooperate with right and left cams provided by an opening cam plate 32 having the slot design shown in Figures 6 and 7. Figure 7 shows the flat form of the plate 32 which may be stamped or otherwise produced from sheet metal or other material pierced to produce slotted formations. Afterwards, the flat plate 32 is bent to the curved form of Figure 6 and affixed about the gate post 16 opposite the upper portion of the gate.

The plate provides right and left cam slots 33 and 33ª the low points of which are designated at 34 and 34ª and the high points at 35 and 35ª. In speaking of low and high points, reference is not made to vertical elevation but to effective work done by the cam followers in moving over the inclined or diagonal cam surfaces from the low points 34, 34ª to the high points 35, 35ª respectively.

The plates 32 provide vertical initial guide slots 36, 36ª leading respectively to the low cam points 34, 34ª. Vertical discharge guide slots 37 and 37ª lead downwardly from the cam high points or lobes 35, 35ª. The pins or cam followers 27, 28 are adapted to travel in these slots and at the upper ends of the guide slots 36, 36ª curved walls 38 are provided in the opening cam plate 32 to guide the pin followers angularly and outwardly to the low points 34, 34ª.

At a lower position on the post 16 and preferably below the hinge barrel 17 is arranged a closing cam plate 39 shown more particularly in Figures 8 and 9 as having a right inclined cam surface 40 and a left inclined cam surface 41 with the low points of the two cam surfaces indicated at 42 and 43. Both cam surfaces lead to a common high point 44. Here again the terms high and low points are used with respect to the effective work done over the cam surfaces and not to vertical elevations. A closing cam follower 45 projects permanently from a lower edge portion of the gate 15 to engage the cam surfaces 40, 41 of the closing cam plate 39. This closing cam follower 45 may be in the form of a pin.

Figures 8, 9:
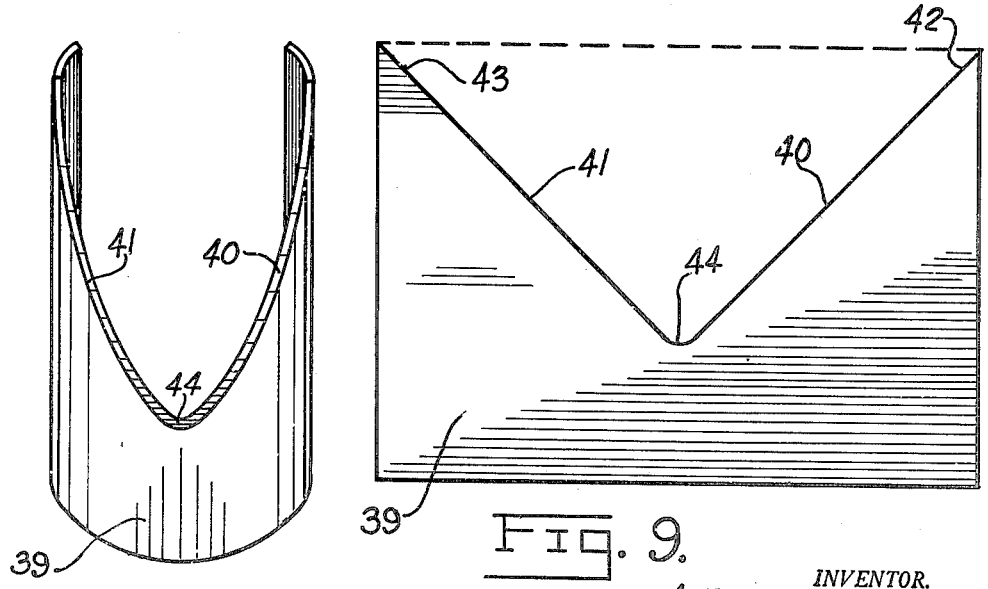
Figure 8 is an enlarged isometric view of the closing cam plate.
Figure 9 is an enlarged flat plan view of the same in a form of manufacture thereof.

Figure 9 shows the flat condition of the closing cam plate 39 as stamped or otherwise produced from sheet metal which is afterwards curved substantially to the form shown in Figure 8 and fitted to the gate post 16 to which it may be affixed in any appropriate manner with its cam surfaces 40, 41 outstanding from the post. The opening cam plate is also affixed to the post 16 with its slot formations outstanding substantially from the post to freely receive the cam follower pins 27, 28.

In operation, Figure 2 shows in dotted lines the wheel of a vehicle approaching the gate from the left as resting upon the plate 21 which has been depressed by the incumbent weight. This has resulted in a pull upon the connection 24ª accompanied by a lifting of the left cam follower pin 28. Figure 2 shows the gate at least partially swung to one side of the gate opening, Figure 2 being taken directly in line of the gate opening. It will be understood that the gate 15 is closed and occupies this gate opening when this left cam follower pin 28 has been initially pulled up to its stop 30. Accordingly, the follower 28 is first swung up with its projecting end entering and moving up the initial guide slot 36. The parts are timed so that the cam follower pin 28 abuts against its stop 30 before such pin reaches the top of the slot 36. When the stop 30 is encountered, the weight pull of the vehicle on the cable 24ª will thereupon lift the gate 15 with its hinge barrel 17 sliding upwardly on the gate post 16 and the cam follower 28 moving up through the remainder of the initial slot 36. This action will continue until the follower pin 28 encounters the upper curved wall 38 which will divert the pin laterally into the cam slot 33 and onto the cam low point 34. The gate is now in an upper potential position. The parts will be held in this position so long as the wheel of the vehicle continues on the operating plate 21. However, these operating plates 20 and 21 will be set back from the gate opening sufficient distances so that the rear wheels of the vehicle may clear the depressible plates just after the parts reach the position shown in Figure 2. As soon as the weight has been relieved from the depressible plate, the springs 22 will raise the plate thus creating slack in the flexible connection 24ª. The weight of the gate acting through the stop 30 on the cam follower pin 28 will, when free, cause the follower pin 28 to ride down the cam slot 33 from the low point 34 to the high point 35 which is offset horizontally around from the gate opening. The potential force of the gate 15 has therefore become kinetic and has performed work in causing the follower 28 to ride along the cam surface to the lobe or high point 35. This work results in swinging the gate to the open position which takes place in advance of the approaching vehicle. All during this time the vehicle is moving and the gate is retiring in front of the vehicle so that the vehicle rapidly passes through the gate opening.

After the follower pin 28 has reached the lobe 35 of the cam, it enters the discharge guide slot 37 and is thereupon free to descend vertically therein. At this point the weight of the gate will be relieved from the follower pin 28 and its spring 31 will promptly retract it out of the slot by a vertically swinging movement about the axis 29 to the position shown with respect to pin 27 in Figure 2. The gate 15, however, will not drop down vertically for the reason that the lower closing cam follower pin 45 will have been moved angularly around to the position in contact with the low point 42 of cam surface 40 on the lower closing cam plate 39. The gravitational weight of the gate 15 will continue to be effective in causing the pin 45 to ride down the inclined cam wall 40 which will gradually have the effect to rotate the gate back to a closed position at which time the follower pin 45 will reach the common high point 44. If the gate tends to oscillate, this pin 45 will ride up on the opposite cam surface 41 so that the common high point 44, connecting as it does with both cam surfaces 40, 41, will promptly damp out any oscillation or vibration of the gate and cause it to come to rest promptly in its properly closed position across the gate opening.

A vehicle approaching from the right hand side of Figure 2 will depress plate 20 to exert a pull upon the cable 24; in this instance raising the right cam follower pin 27 into the vertical slot 36ª while the left cam follower pin 28 remains retracted and inoperative. The pin 27 will be lifted against its stop 30 moved up in the vertical initial guide slot 36ª reaching the low point 34ª and thence sliding down the inclined plane 33ª causing the gate 15 to swing open in the opposite direction; and eventually the follower pin 27 will descend in the vertical discharge slot 37ª and be retracted by its spring 31. During these operations the cam follower pin 45 will have arrived at the low point 43 of the cam surface 41 and when the weight of the gate is released to this pin 45, such pin will ride down the cam surface 41 and cam the gate 15 back to its closed position with the pin 45 coming to rest in the common high point 44.

Although I have disclosed herein the best form of the invention known to me at this time, I reserve the right to all such modifications and changes as may come within the scope of the following claims.

What is claimed as new is:

1. For use with a gate and hanger post therefor, a gate opening and closing apparatus comprising a gate hanger for supporting the gate for horizontal swinging and limited vertical movements about the axis of said post, a normally-retracted opening cam follower on the gate, an opening cam adapted to be secured to said hanger post adjacent the hanger and having a diagonally inclined plane with its effective cam low point disposed uppermost and its lobe or effective cam high point lowest and offset horizontally from the plane of closed gate position, means for initially shifting the follower from retracted position into potential position and subsequently lifting the gate and follower to a weight potential position into engagement with the low point of the cam whence the follower is free to ride down the inclined plane under the gravitational drop of the gate to cam the gate to open position, a closing cam adapted to be secured to said hanger post and having a diagonally inclined plane of V-shape with the apex of the V directed downwardly, and closing cam engaging projection adapted to be carried by said gate and being positioned thereon to engage said closing cam upon disengagement of said opening cam follower with said opening cam whereby said gate is restored to a closed position.

2. For use with a gate and hanger post therefor, a gate opening and closing apparatus comprising a gate hanger for supporting the gate for horizontal swinging and simultaneous limited vertical movements about the axis of said post, right and left cams adapted to be secured to said post adjacent the hanger and having effective low points in substantial alinement with the gate opening and effective high points or lobes offset horizontally from the gate opening, guides on said cam leading to the low cam points and from the high cam points, right and left cam followers pivoted to the gate in position to engage the respective cams and guides, stops on the gate in the paths of the followers, selective cam follower raising means for initially raising either of the followers against the stops and into the guides leading to the cam points and subsequently lifting the followers and entrained gate moving the followers through the last-mentioned guides to the effective low points of the cams whereupon on release of the vehicle-actuated means the gate drops by gravity drawing the engaged follower down the respective cam to swing the gate open after which the follower descends in the guide leading from the cam high point, a closing cam adapted to be secured to said hanger post and having a diagonally inclined plane of V-shape with the apex of the V directed downwardly, and a closing cam engaging projection adapted to be carried by said gate and being positioned thereon to engage said closing cam upon disengagement of said opening cam follower with said opening cam whereby said gate is restored to a closed position.

References Cited in the file of this patent

UNITED STATES PATENTS

| Number | Name | Date |
| --- | --- | --- |
| 554,180 | Good | Feb. 4, 1896 |
| 1,424,913 | Kahler | Aug. 8, 1922 |
| 1,648,691 | Matthews | Nov. 8, 1927 |
| 2,520,642 | Laurantus | Aug. 29, 1950 |